F. O. JAQUES, Jr.
MEASURING INSTRUMENT.
APPLICATION FILED APR. 24, 1920.
1,357,323.
Patented Nov. 2, 1920.
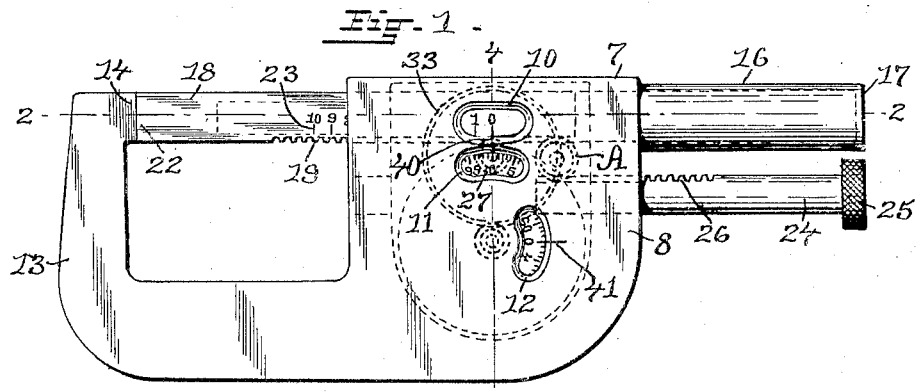
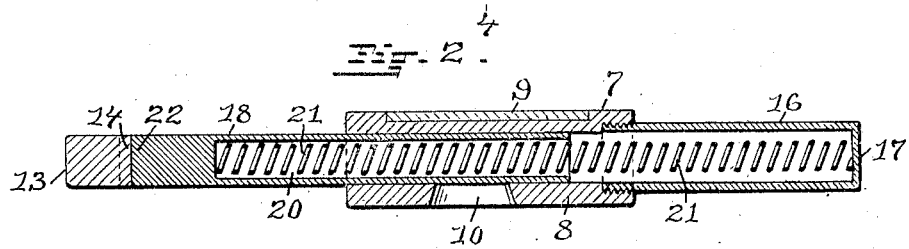
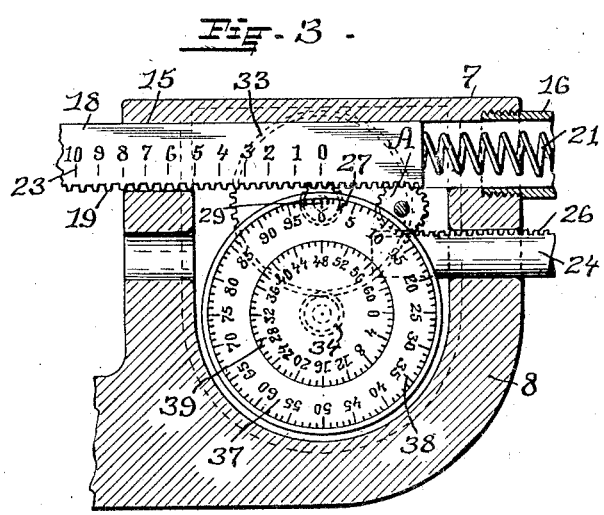
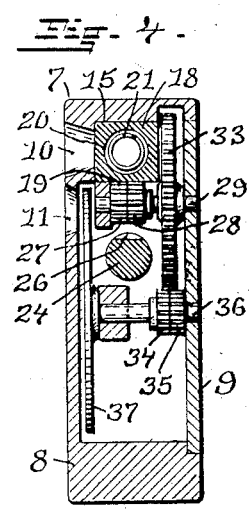
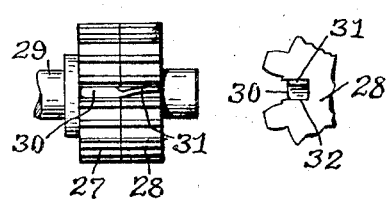
INVENTOR:
Fernando Oscar Jaques, Jr.,
by Chas. A. Luther
ATTORNEY.

UNITED STATES PATENT OFFICE.

FERNANDO OSCAR JAQUES, JR., OF PROVIDENCE, RHODE ISLAND.

MEASURING INSTRUMENT.

1,357,323.

Specification of Letters Patent. Patented Nov. 2, 1920.

Application filed April 24, 1920. Serial No. 376,338.

*To all whom it may concern:*

Be it known that I, FERNANDO OSCAR JAQUES, Jr., a citizen of the United States, residing at Providence, in the county of Providence and State of Rhode Island, have invented a new and useful Improvement in Measuring Instruments, of which the following is a specification.

My invention has reference to instruments of precision and more particularly to an improvement in measuring instruments for measuring the size or thickness of various articles.

The object of my invention is to provide such an instrument in which the measuring bar is operated manually to withdraw in one direction and to close automatically on to the thing to be measured in the opposite direction.

Another object of my invention is to provide such an instrument with sight openings, the measuring being given by lines and numerals easily seen through the sight openings.

My invention consists in the peculiar and novel construction of such a measuring instrument, said measuring instrument having details of construction as will be more fully set forth hereinafter and claimed.

Figure 1 is a face view of my improved measuring instrument in its normally closed position.

Fig. 2 is a longitudinal sectional view through the instrument taken on line 2.2 of Fig. 1.

Fig. 3 is an enlarged detail sectional view looking into the body of the instrument.

Fig. 4 is an enlarged transverse sectional view taken on line 4.4 of Fig. 1 through the instrument.

Fig. 5 is an enlarged edge view of one of the twin spring tension pinions, and

Fig. 6 is a still further enlarged detail side view of part of the loose pinion showing the end of the spring in the loose pinion.

In the drawing 7 indicates the frame comprising a hollow body 8, having a cover 9 on the back, sight openings 10, 11 and 12 in the face or front and an L shaped arm 13 having an end 14, forming an opening between the arm and the body 8. A square hole 15 is formed through the body 8, on a line with the end 14 of the arm 13, and a sleeve 16 having a closed end 17 is secured by screwing it into the body 8 on a line with the square hole 15, as shown in Fig. 3. A square measurig rack-bar 18 having rack teeth 19 and a central longitudinal bore 20, is reciprocally supported in the square hole 15 in the body 8 and may be moved into the sleeve 16. The ends of a coiled spring 21 in the sleeve 16 and bore 20 engage with the end 17 of the sleeve and the closed end of the bore and normally holds the end 22 of the rack-bar 18 against the end 14 of the arm 13 under spring tension. On the face of the rack-bar 18 are lines and numerals 23 which divide one inch into twelve equal parts and which are easily seen through the sight opening 10. An operating rack-bar 24 is slidably supported in the body 8, parallel with the sleeve 16, and has an outer finger end 25 and rack-teeth 26 which mesh with a pinion A which is on a shaft in bearings in the body 8 and cover 9 and which in turn meshes with the teeth 19 on the measuring rack-bar 18. The teeth on the rack-bar 24 also mesh with twin pinions 27 and 28, of preferably ten teeth each and which in turn mesh with the rack-teeth 19 on the rack-bar 18. The pinion 27 is secured to and the pinion 28 is loose on a shaft 29 rotatably supported in bearings in the body 8 and cover 9, as shown in Fig. 4. A tension spring 30 is secured in the fixed pinion 27, the free end 31 of the spring bearing against the side of an opening 32 in the loose pinion 28 as shown in Figs. 5 and 6, thereby holding the teeth of the pinions against the teeth of the rack-bars 18 and 24, under spring tension. A gear 33 of preferably fifty teeth is secured to the shaft 29 and meshes with twin pinions 34 and 35 of preferably ten teeth each, which are on a shaft 36 and which have the same construction and operate the same as the pinions 27 and 28. The shaft 36 is rotatably supported in bearings in the body 8 and cover 9, as shown in Fig. 4 and has on its forward end a disk 37 on the face of which is a circular series of lines and numerals 38 which divide one-tenth of an inch into one hundred equal parts, and which are seen through the sight opening 11 and a circular series of lines and numerals 39 which divide one-tenth of an inch into sixty-four equal parts of an inch and which are seen through the sight opening 12. On the face of the body 8 there is also an indicating line 40 for the sight openings 10 and 11, and an indicating line 41 for the sight opening 12, as shown in Fig. 1.

When in use the instrument is preferably held between the thumb and second finger with the first or index finger on the finger end 25 of the operating rack-bar 24. An inward pressure on the rack-bar 24 will now operate through the pinion A to open or move the measuring rack-bar 18 inward, against the tension of the coiled spring 21 and simultaneously to rotate the disk 37 through the pinions 27 and 28, the gear 33 and the pinions 34 and 35. The thing to be measured is now placed against the end 14 of the arm 13, and the pressure on the operating rack-bar 24 released, thereby allowing the coiled spring 21 to move the end 22 of the measuring rack-bar 18 against the thing to be measured, under spring pressure. As this coiled spring 21 is comparatively long, the pressure of the end 22 on the article to be measured is practically uniform for any size article that can be placed in the instrument. If the article to be measured is two hundred and twenty-five one thousandths of an inch thick, the numeral 2 will show through the sight opening 10 and the numerals 25 will show through the sight opening 11 on a line with the indicating line 40, and so on; the numerals and lines 23 indicating through the sight opening 10, tenths of an inch; the lines and numerals 38 indicating through the sight opening 11, thousandths of an inch; and the numerals 39 indicating through the sight opening 12, sixty-four tenths of an inch.

By this construction the end 22 of the measuring rack-bar 18 engages with the article to be measured mechanically, under spring tension, and the heretofore human sense of touch for this purpose is eliminated.

Having thus described my invention, I claim as new.

1. A measuring instrument comprising a body having a sight opening, an L shaped arm and a closed end sleeve on the body on a line with the end of the arm, a measuring rack-bar reciprocally supported in the body on a line with the sleeve and the end of the arm, and having lines and numerals under the sight opening and a longitudinal bore, a coiled spring in the sleeve and bore and engaging with the end of the sleeve and the end of the bore, an operating rack-bar reciprocally supported in and extending out of the body, a pinion rotatably supported in the body and operatively connecting the measuring rack-bar with the operating rack-bar, whereby the measuring rack-bar may be drawn away from the end of the arm against the tension of the spring and automatically moved toward the end of the arm by the tension of the spring.

2. A measuring instrument comprising a hollow body having sight openings, an L shaped arm and a closed end sleeve on the body, a measuring rack-bar reciprocally supported in the body on a line with the sleeve and the end of the arm and having lines and numerals under a sight opening and a longitudinal bore, a coiled spring in the sleeve and bearing against the end of the sleeve and bore, an operating rack-bar reciprocally supported in and extending out of the body, a pinion rotatably supported in the body and operatively connecting the rack-bars, a shaft rotatably supported in the body, a pinion on the shaft engaging with the measuring rack-bar, a gear on the shaft engaging with a pinion on a second shaft rotatably supported in the body, and a disk on the second shaft having lines and numerals on its face showing through the other sight opening, for the purpose as described.

3. A measuring instrument comprising a hollow body having sight openings, an L shaped arm and a closed end sleeve, a square measuring rack-bar reciprocally supported in the body on a line with the sleeve and the end of the arm, and having lines and numerals under a sight opening and a bore, a coiled spring in the sleeve and bore against the end of the sleeve and bore, a round operating rack-bar reciprocally supported in and extending out of the body, a pinion rotatably supported in the body and operatively connecting the rack-bars, a shaft rotatably supported in the body, a fixed pinion on the shaft engaging with the measuring rack-bar, a loose pinion on the shaft engaging with the measuring rack-bar, a spring secured to the fixed pinion and engaging with the loose pinion, a gear on the shaft engaging with a pinion on a second shaft rotatably supported in the body and a disk on the second shaft having lines and numerals on its face showing through a sight opening, for the purpose as described.

In testimony whereof, I have signed my name to this specification.

FERNANDO OSCAR JAQUES, Jr.